Jan. 5, 1932.  E. CHAGNIARD ET AL  1,839,645
AIRPLANE FUSELAGE AND METHOD OF CONSTRUCTING THE SAME
Filed Sept. 20, 1929  2 Sheets-Sheet 2
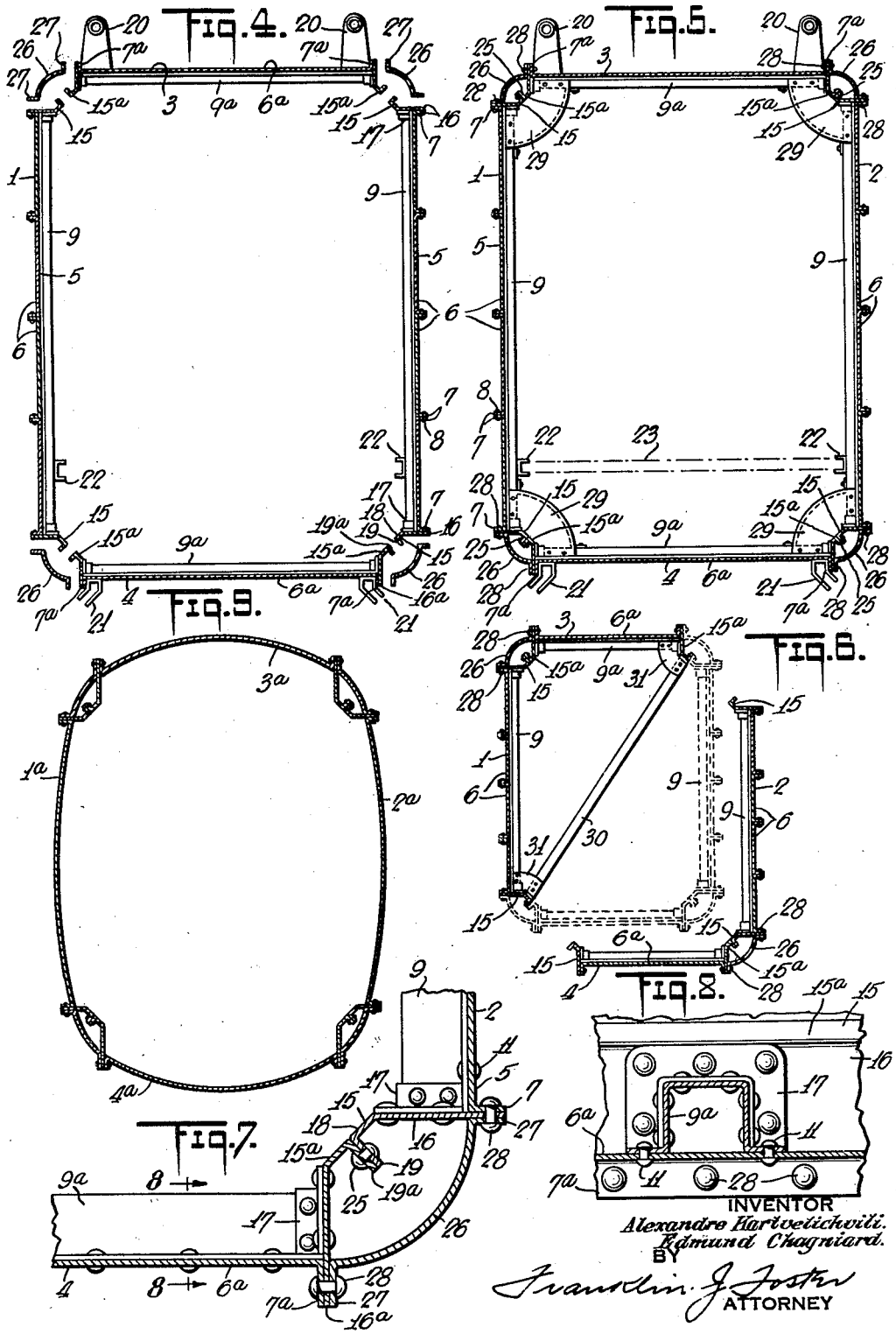

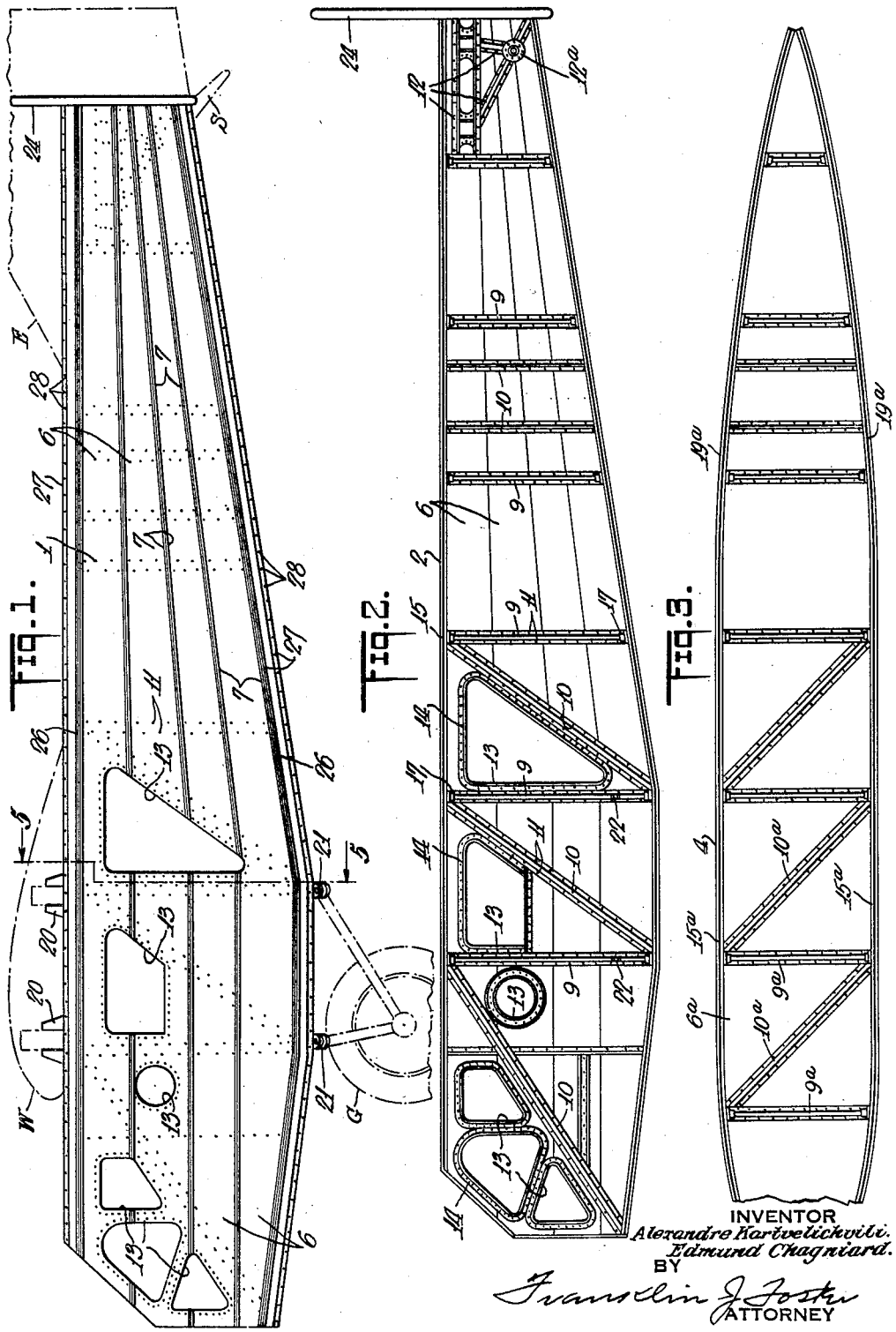

Patented Jan. 5, 1932

1,839,645

UNITED STATES PATENT OFFICE

EDMOND CHAGNIARD AND ALEXANDER KARTVELICHVILI, OF NEW YORK, N. Y., ASSIGNORS TO CHAGNKART INTERNATIONAL AVIATION CORPORATION, OF NEW YORK, N. Y., A CORPORATION OF NEW YORK

AIRPLANE FUSELAGE AND METHOD OF CONSTRUCTING THE SAME

Application filed September 20, 1929, Serial No. 394,052, and in France November 24, 1929.

Our present invention while capable of applicability in other arts, is particularly adapted for embodiment in airplane fuselages and methods of making and assembling them.

An object of the invention is to so construct the fuselage that the need for internal riveting or other work within the cramped quarters afforded in the restricted portions of the body is substantially eliminated.

Another object is to provide a fuselage which may be expeditiously assembled and in which various attachment fixtures are carried by the fuselage parts and automatically correctly positioned as an incident of assembling the fuselage.

Another object is to so construct the fuselage that it is well adapted to resist the usual strains and stresses to which it is subjected in use, an important contributory factor in this connection being an arrangement of fuselage parts which provides for the formation of hollow longérons upon proper assembly of the fuselage parts.

In a preferred embodiment of the invention a plurality of factory fabricated panel units each internally reinforced and each carrying appropriate attachment fittings or fixtures for the airfoils, landing gears, stabilizers, elevators, etc., are assembled to form a hollow shell, all of the necessary connective seams required to join the panels being formed by external riveting of overlapping or abutting marginal panel flanges. Preferably four panels are employed to form the sides, top and body of the fuselage and the corner seams are enclosed and strengthened by concave corner pieces secured to the edges of adjacent panels and cooperating with the previously formed body to define hollow longérons.

The invention may be more fully understood from the following description in connection with the accompanying drawings, wherein:

Fig. 1 is a side elevational view of an airplane embodying our invention;

Fig. 2 an inside view of one of the side panels of the fuselage;

Fig. 3 an inside view of the bottom panel of the fuselage;

Fig. 4 a transverse sectional view showing the fuselage parts prior to assembly;

Fig. 5 a transverse sectional view on the line 5—5 of Fig. 1;

Fig. 6 a transverse section through the rear end of the fuselage, showing the latter partly assembled;

Fig. 7 an enlarged detail section, through one of the corner seam structures;

Fig. 8 a sectional detail on the line 8—8 of Fig. 7; and

Fig. 9 a transverse sectional view through a fuselage of different cross section.

Our improved fuselage structure includes four rigid panels extending substantially the length of the fuselage and forming the exterior walls thereof. The side wall panels 1 and 2 are substantial duplicates. They are joined to the top and bottom panels 3 and 4 in a manner, described hereinafter, to form a strong, rigid fuselage.

Each side panel includes a sheet metal wall 5 composed of a plurality of longitudinally extending sections 6 having flush inner faces and outturned longitudinal edge flanges 7. The overlying flanges 7 of contiguous sections 6 form strengthening ribs and seams when riveted together at 8. Transverse channelled reinforcing beams 9 and 10 are formed with outturned longitudinal flanges riveted at 11 against the inner faces of the panel sections. The arrangement of the beams may be varied to suit different requirements, but preferably beams 9 are vertically disposed and beams 10 are oblique and connect opposite ends of adjacent beams 9. At the stern end of the panel, additional beams 12 brace it for properly supporting the rudder, the stabilizers, and other members of the empennage, indicated at E, and also the tail skid S, the attachment fittings 12ª for these various elements being held in position by the beams. Near their forward ends the panels are formed with openings 13 defining doorways, windows, port holes and the like and trimmed with angular reinforcing frames 14 riveted to the inner face of the panel.

The uppermost and lowermost flanges 7 of each side panel extend the full length of the longitudinal edges of the panel, and carry longitudinal metal angle members 15, the flanges 16 of which abut the flanges 7 and are riveted thereto. These flanges also extend inwardly over the adjacent ends of the beams 9 and are fixed thereto at 17. Inwardly of the flanges 16 each angle member is formed with obliquely inwardly extending portion 18 having an edge flange 19 turned outward at right angles to such portion.

The upper and lower panels 3 and 4 are generally similar in construction to the side panels save that their outer walls are preferably formed of a single sheet $6^a$ of metal. Outturned longitudinal edge flanges $7^a$ on the sheet metal reinforcing beams $9^a$ and $10^a$, and longitudinal angle members $15^a$ at its edges correspond to similar parts of the side panels.

Prior to the assembly of the panels suitable attachment fixtures are mounted upon them. For instance brackets 20 are mounted upon the exterior of the upper panel 3 for the anchorage of the airfoil or wings W; brackets 21 for attachment of the landing gear G are fixed upon the exterior of the lower panel 4; and anchorages 22 for the support of floor beams 23 are carried by the side panels 1 and 2. One of the side panels may also mount the rudder post 24.

In assembling the panels the angle members 15 and $15^a$ are brought together and riveted at 25. These flanges are fully exposed and accessible for convenient application of the rivets. A longitudinal cover strip 26 in the form of a metal plate curved or bowed outwardly in transverse section and formed with marginal flanges 27 designed to abut the flat flanges 16 and $16^a$ of the angle members is next placed in position, its flanges 27 being riveted to the flanges 16 and $16^a$ along the length thereof as at 28. This riveting work may also be conveniently performed.

The union of the flanges 7 and $7^a$, angle members 15 and $15^a$ and cover strip 26 produce a strong corner seam structure, rigidly joining the panels. The angle members combined with the cover strips additionally provide hollow, reinforcing longérons further increasing the stress resisting qualities of the fuselage.

To resist torsional stresses of the fuselage the inner corners of the forward portion thereof are reinforced by segmental elements 29 riveted or otherwise secured to the beams 9 and $9^a$. This reinforcing means is employed in the larger portion of the fuselage, where the space is sufficient to permit their convenient installation. The rear more constricted portion of the fuselage may be braced by diagonal beams 30 extending between angle members 15 and $15^a$. The end of members 30 are joined to the angle members and to the beams 9 and $9^a$, by segmental plates 31. The beams 30 may be conveniently put in place and secured by assembling the panels in pairs as indicated in Fig. 6 to avoid internal riveting.

It will be seen that our invention facilitates the construction of a fuselage, and reduces its cost while producing a strong and satisfactory construction and leaving all of the seam riveting exposed so that disassembly may be quickly effected for purposes of replacement or repair.

The component parts of each panel unit are preferably made of duralumin or equivalent materials. The angle members, braces and cover strips are made of thicker stock than the panel plates to stiffen the latter.

In Fig. 9 is shown a paneled fuselage structure having a curved cross sectional contour due to the convexity of panels $1^a$, $2^a$, $3^a$ and $4^a$. Its structure is in all vital respects similar to that of the form above described. Structural details have been omitted from this figure to simplify the showing.

It will thus be seen that there is herein described apparatus in which the several features of this invention are embodied, and which apparatus in its action attains the various objects of the invention and is well suited to meet requirements of practical use.

As many changes could be made in the above construction, and many apparently widely different embodiments of this invention could be made without departing from the scope thereof, it is intended that all matter contained in the drawings shall be interpreted as illustrative and not in a limiting sense.

We claim:

1. A fuselage structure comprising a plurality of stiff, separately constructed, longitudinal panels shaped and assembled to form the exterior of the fuselage, each panel extending substantially the length of the fuselage; and external seam structures joining the opposed longitudinal edges of the assembled panels, each seam including a pair of abutting outturned longitudinal flanges, a longitudinal row of fastening elements securing said abutting flanges together; a pair of outturned longitudinal flanges spaced from the opposite sides of the abutting flanges and entending therealong, a cover strip covering the abutting flanges and formed with longitudinal margins abutting said spaced flanges, and longitudinal rows of external fastening elements securing the cover strip to the spaced flanges, said joint structures forming hollow external, reinforcing longérons.

2. A fuselage structure comprising separately constructed side, top and bottom panel units, each unit comprising a metal sheet, and reinforcing beams secured to the inner face of the sheet to render it stiff; and means adapting the panel units to be rigidly joined in assembled relation by tube forming fastening means applied entirely at the exterior of the fuselage body.

3. A fuselage structure comprising four separately constructed, rigid, longitudinal panel units, two of them shaped to form the opposite sides of the fuselage, the other two shaped to form the top and bottom thereof and all formed to extend substantially the length of the fuselage; and outturned flanges carried by each panel unit and extending along the opposite longitudinal edges thereof, the opposed flanges of the different units abutting when the units are assembled and being secured together by fastening means applied entirely outside of the fuselage body to thereby form longitudinal seams at the transverse corners of the assembled structure; and stiff longitudinal cover strips formed to externally cover said corner seams, adapted to be secured to the assembled panel units along opposite sides of the corners by fastening means applied outside of the fuselage body, and designed to cooperate with the seams and form tubular reinforcing longérons extending substantially the length of the fuselage.

4. A fuselage structure comprising a plurality of stiff panel units adapted to be assembled to form the exterior of the fuselage; means to hold said units assembled; airfoil attachment means mounted upon one unit prior to assembly of the units; and landing gear attachment means mounted upon another of said units prior to the assembly of the units.

5. A longitudinal panel unit shaped to form part of the exterior of a fuselage and extend substantially the length thereof, comprising a metal sheet; reinforcing beams secured against the inner face of said sheet to stiffen it; and longitudinal angle members extending along the opposite longitudinal edges of the sheet, secured to the latter and to the reinforcing beams and spaced from the first mentioned beams and formed with outturned flanges for attachment to other panel units in a fuselage assembly by fastening means entirely outside of the fuselage body.

6. A fuselage structure comprising a plurality of stiff, longitudinal panels shaped and assembled to form the exterior of the fuselage; longitudinal angle members extending along the opposite longitudinal edges of each panel and secured thereto and to the angle members of the adjacent panels; and braces extending across the interior of the fuselage and secured at their opposite ends to the angle members.

7. An aircraft body structure comprising a plurality of longitudinal panels shaped and assembled to form the exterior of the body and each formed with outturned flanges extending along its opposite longitudinal edges; longitudinal seam structures rigidly joining the opposed edges of the assembled panels and each comprising a longitudinal angle member abutting and secured to the panel flange of one of the opposed edges and formed with an outturned flange; a complementary angle member abutting and secured to the adjacent flange of the other panel and formed with an outtured flange abutting that of the other angle member and secured thereto; and a longitudinal, external cover strip secured along its longitudinal margins to the portions of the angle members secured to the panel flanges, bowed outwardly between said margins, and concealing the abutting flanges of the angle members, said seam structures forming tubular reinforcing beams.

Signed at New York city, in the State and county of New York, this 18th day of September, 1929.

EDMOND CHAGNIARD.
ALEXANDER KARTVELICHVILI.